Figure 4:
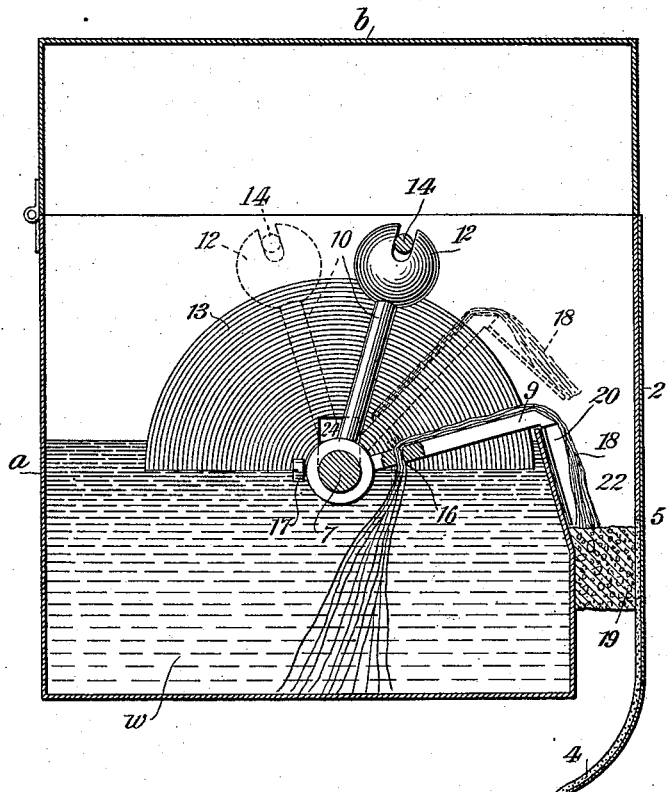

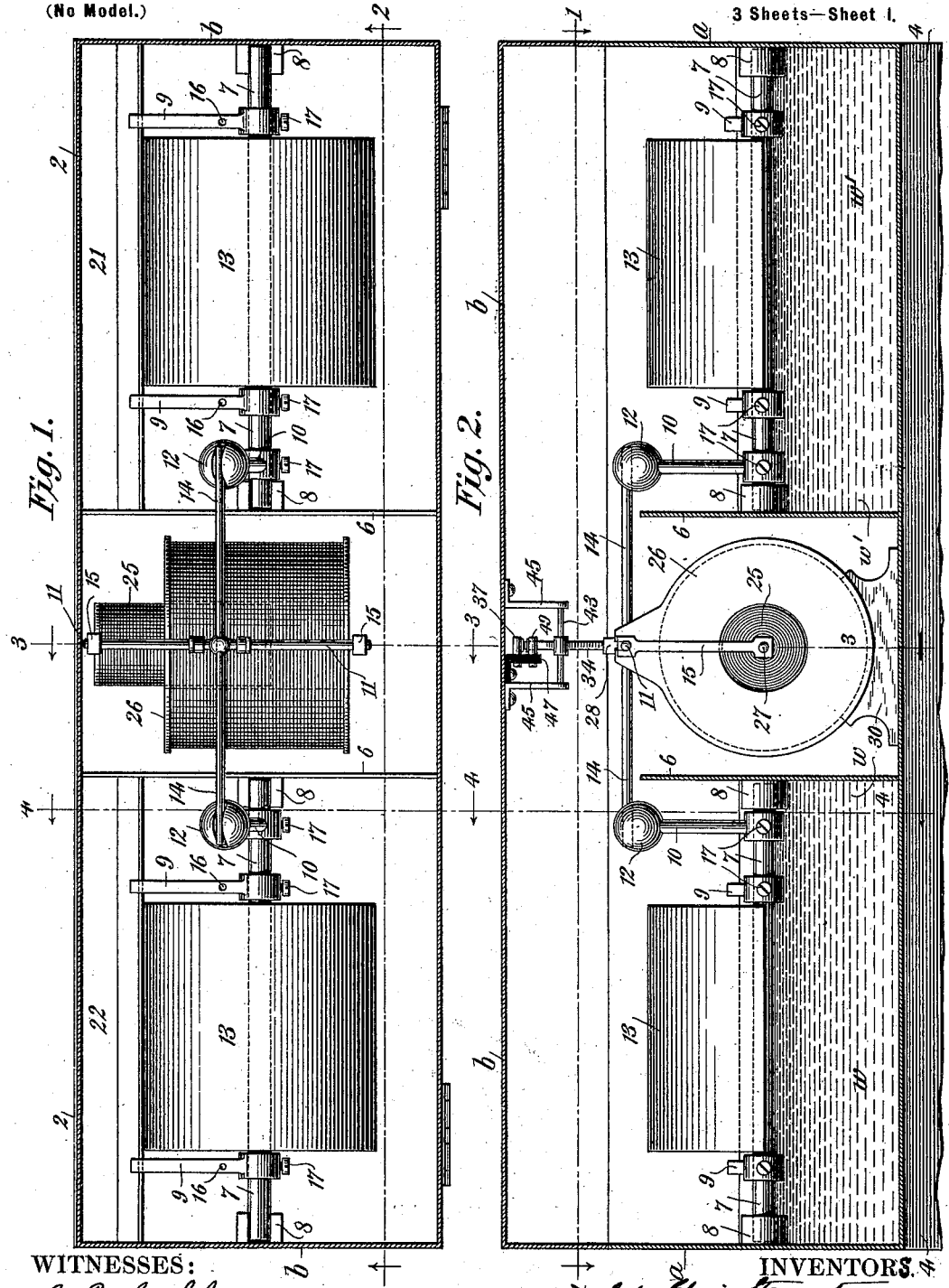

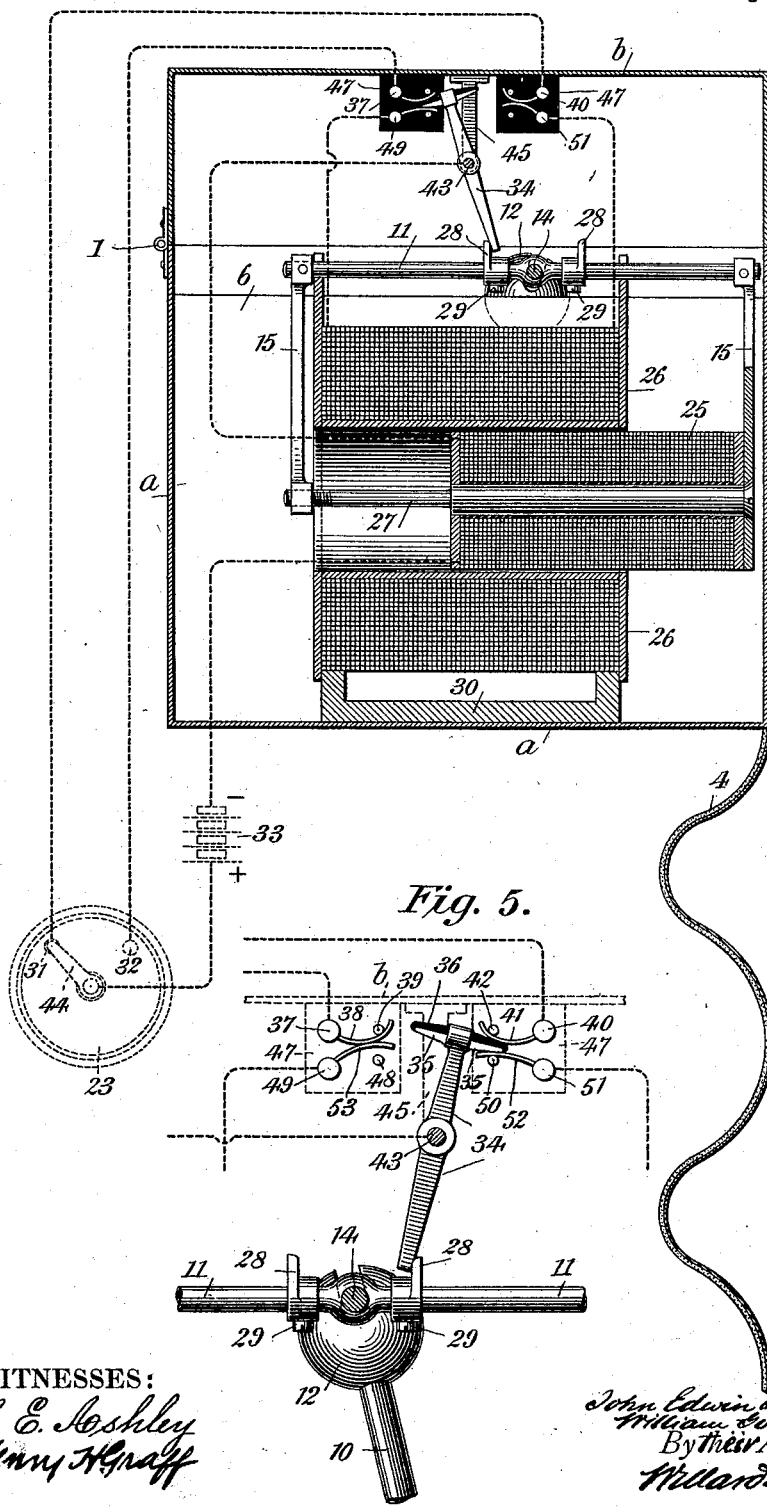

No. 694,396. Patented Mar. 4, 1902.
W. G. LYLE & J. E. STEWART.
APPARATUS FOR VAPORIZING LIQUIDS.
(Application filed Feb. 16, 1901.)
(No Model.) 3 Sheets—Sheet 3.

WITNESSES: INVENTORS

UNITED STATES PATENT OFFICE.

WILLIAM GORDON LYLE AND JOHN EDWIN STEWART, OF NEW YORK, N. Y.

APPARATUS FOR VAPORIZING LIQUIDS.

SPECIFICATION forming part of Letters Patent No. 694,396, dated March 4, 1902.

Application filed February 16, 1901. Serial No. 47,578. (No model.)

*To all whom it may concern:*

Be it known that we, WILLIAM GORDON LYLE and JOHN EDWIN STEWART, subjects of the King of Great Britain, and residents of the city of New York and State of New York, have invented a new and useful Improvement in Apparatus for Vaporizing Liquids, of which the following is a specification.

Our invention relates to an improvement in apparatus for vaporizing liquids for any purpose, more particularly for medical and hygienic purposes; also, for automatically supplying any desired amount of vapor to air in a room and maintaining the air in any room substantially at any desired degree of humidity.

Heretofore various devices have been employed for vaporizing liquids with a view to automatically regulating the humidity of air; but most of them have been in practice found to be unsatisfactory, for the reason that they fail to properly regulate the supply of the liquid to the vaporizer. Others are unsatisfactory for the reason that they employ steam, which is usually taken from radiators, which is accompanied usually by objectionable odors. We have discovered that where a vaporizer is employed in which a wick is used one end of which rests in the liquid to be vaporized and the other end of which comes in contact with the surface upon which the vaporization is to take place and agencies are provided which from time to time separate the wick, and consequently automatically stop the flow of liquid through it, that it is possible to maintain substantially any desired degree of humidity in any chamber in or in connection with which the device is placed. The gist of the invention lies, therefore, first, in employing what we have termed hereafter a "divided wick," which acts to a certain extent as a controllable siphon, and, second, in employing any convenient means for actuating and controlling wick either automatically through a hygrometer or intermittently by hand or by any desired mechanism. Hence the apparatus for actuating the wick permits of a large variety of constructions, and we therefore do not confine ourselves to the precise construction shown in the specification nor necessarily to a vaporizing apparatus.

Our invention as applied to a vaporizing apparatus will be best understood by reference to the accompanying three sheets of drawings, forming a part of this specification, in which—

Figure 1 is a plan view of the apparatus on the lines 1 1 of Fig. 2. Fig. 2 is a longitudinal elevation of the apparatus on the lines 2 2 of Fig. 1. Fig. 3 is a cross-section of the apparatus on the lines 3 3 of Fig. 1. Fig. 4 is also a cross-section on the lines 4 4 of Fig. 1, and Fig. 5 is an enlarged detail view of Fig. 3.

Similar letters refer to similar parts throughout the several views.

In the drawings, $a$ represents a receptacle for holding the liquid and the operating mechanism, which can be of any convenient shape and size. In the drawings we have shown a box holding the operating mechanism and two water-tanks $w$ and $w'$; but the number of these tanks can be decreased and increased as may be desired. In the receptacle shown three compartments are provided, formed by the partitions 6, two of which compartments, $w$ and $w'$, forming the tanks for the liquid and the third holding the operating mechanism. As shown in Fig. 4, an opening in the bottom of the receptacle is left opposite the liquid-tanks, and the side of the tank is built up a sufficient distance to contain the liquid, thus leaving channels 21 and 22 for the outflow of the liquid by means of the wick. The receptacle $a$ is provided with a cover $b$, hinged at the point 1. On the side of the receptacle containing the channels 21 and 22 an ordinary vaporizing-plate 2 is attached, the inner part of which is provided with some hydroscopic material 4 for holding the fluid. The plate 2 may be of any desired shape and may be retained at any desired temperature in any convenient manner, which is not shown, as its form is immaterial to the invention. Each water-compartment contains a rocking-shaft 7, supported by the journals 8, attached at either end to the sides of the tank at a convenient level, in which journals the ends of the shaft rock. These shafts 7 carry any desired number of wick-arms 9, held at any desired angle on the shaft by the screws 17. These wick-arms can be as numerous as desired. They are ordinary flat surfaces capable of holding the wick loosely, are cut away at the outer extremity, as shown, and each are provided at the end with a supporting-guide 20 for holding the wicks in place when the arms are withdrawn. Near the lower end of the wick-arms a circular opening 16 is provided, through which the ends of the wicks are let down into the liquid. Any convenient form of device may be resorted to for keeping the level of the liquid up to and within certain limits. No device, however, is shown in the present case, as this is no material part of the present invention. In the construction shown semicircular floats 13 are provided, rotating about the shafts and resting on the surface of the liquid; but any other method of accomplishing this result can be employed. These floats are slotted in the center, as shown at 24, adapted to fit over the shaft 7 and allow the float to sink as the volume of liquid is diminished a certain distance on the shaft and then rotate on the shaft, thus by deplacement assisting in retaining the level of the liquid as high as possible in the tank. The shafts 7 also carry counterweight-arms 10, set thereon at any angle desired by the screws 17. These counterweight-arms terminate in the weighed heads 12, which are grooved, as shown, so as to contain and be operated by the cross-arm 14. When a reciprocating motion is imparted to the cross-arm 14 in the manner hereinafter described, it will carry the counterweight-arms 10 in the same distance, and thereby rock the shaft 7, thus carrying the wick-arms 9 a sufficient distance to raise or lower the free ends of the wicks. When the counterweight-arms are in the position shown in the dotted lines in Fig. 4, the weighted head will serve to rock the shaft 7 beyond the point of dead-weight hereinafter referred.

Cotton, silk, sponge, or any other known material capable of acting as a siphon may be used for the wicks. These wicks can be used singly or in two parts, one fixed and the other movable, and the fixed part may be composed partly of a sponge 19, as shown in Fig. 4. In the drawings the fixed part 4 of the wick or sponge 19 is connected with the vaporizing-plate 2 and is placed in the channel 22, beginning, preferably, at any convenient distance below the water-level and reaching below the bottom of the tank. The movable part of the wick 18 rests on the arm 9, one end reaching down into the liquid through the opening 16 and the other end being placed on the arm 9 as to just meet the sponge 19 when the arm is in the position shown in Fig. 4, thus forming a continuous wick and allowing the liquid to flow from the tank to the vaporizing-plate 2. Whenever the end of the wick is withdrawn from the sponge or fixed portion of the wick and its ends brought above the level of the liquid in the position indicated by the dotted lines in Fig. 4, the flow of the liquid through the wick will instantly cease. As before stated, the wicks can be operated in various ways. In the drawings they are shown operated by electricity, which is brought into action by means of a hygrometer suitably fitted and supplied with the necessary wires, contacts, &c., and provided with an automatic circuit-breaking device, so that the current will be employed only when it is necessary to regulate the feed of the liquid to the plate and then only for such period as it takes to move arm 14 by the movement of the armature 27 of the hollow cylindrical coil 26 to travel over its path.

In the drawings, 26 represents a fixed and hollow cylindrical coil supported on the base 30, fastened to the bottom of the receptacle $a$, within the center of which moves the core 27, wound as shown by 25. The core 27 is made in the form of a screw, extending beyond the fixed coil and supporting the arms 15, which in turn support the cross-bar 14, operating the wicks. This movable coil and core move freely in and out of the fixed coil, according as the current is applied to the latter, and thus move the arm 14 a like distance and rock the shaft 7 a sufficient distance to carry the movable part of the wick into and out of contact with the sponge and above and below the level of the liquid.

In the present application a hygrometer is employed as a convenient method of controlling the electric current. The hygrometer is indicated by the dotted lines 23, provided with the contact-points 31 and 32, and the arm 44 is connected in circuit with either pole of a battery 33. These points 31 and 32 represent the extremes of humidity desired. For making and breaking the circuit and reversing the same we have provided the arrangement shown in Fig. 5. In the drawings a rocking arm 34 is shown supported on an axle 43, supported and rocking freely in the brackets 45, attached to the top of the receptacle. The arm 34 is rocked by the engagement of its lower end with the pins 28, attached in the proper position to the cross-bar 14 by the screws 29. This arm is made of any conducting metal and is in circuit with the movable coil 25 and battery 33, as will be seen. The arm 34 is provided at its upper extremity with two pins 35, one at either side, the upper half of each of which, 36, is composed of a non-conducting material, indicated in black.

Within the brackets 45 are attached the plates 47, also screwed to the top of the receptacle $a$. These plates are provided with binding-posts 37 49 40 51, to which are attached the curved springs 38 53 41 52. The rocking arm 34 is so arranged as not to be actuated by the cross-bar 14 until the core 27, carrying with it the arms 15 and the cross-bar 14, has moved nearly its full distance in or out of the fixed coil.

The operation of the apparatus is as follows: The tanks are filled with liquid, the wicks inserted and placed in contact with the fixed wick, preferably as shown in Fig. 4, thus giving a continuous supply of the liquid to the vaporizing-plate. In this position the core 27 and armature are drawn out their full distance from the fixed coil 26, and the left-hand pin of the rocking arm 34 resting within the springs 38 53. As the humidity in the air alters the arm 44 of the hygrometer moves toward the extremity of the contact-point 31. At the moment this point is reached, which is the position shown in Fig. 3, a complete circuit is made from the battery through the arm 44 and contact-point 31, the binding-posts 40 and 51, and springs 41 and 52, the fixed coil 26, the binding-post 49, spring 53, pin 35, arm 34, movable coil 25, and back to the battery 33. The immediate effect of this will be to vitalize the fixed coil and movable coil with opposite magnetism and draw the movable coil and arms 15 back within the fixed coil. When the coil 25, carrying the cross-arm 14, has returned within the fixed coil about three-quarters of the distance, the pin 28 on the arm 14 will engage the rocking arm 34, swing the top of the arm out of contact with the springs 38 and 53. This will immediately break the circuit; but as the weighted arm 10 has now passed beyond the apex of the circle and assumed the position indicated by the dotted lines in Fig. 4 the weighted head 12 will carry the arm 14 and the movable coil 25 the remaining distance within the fixed coil and the pin 28 will force the right-hand pin of the rocking arm 34 between the springs 41 52. When the humidity has fallen a sufficient distance to bring the arm 41 of the hygrometer to the other extremity of the contact-point 32, a complete circuit will again be formed, as appears from the drawings. The current being thus reversed, the core and movable coil will be repelled and forced out of the fixed coil, reversing the operation completely and returning the rocking arm once more into its original position, (shown in Fig. 3,) and the wick into contact once more with the fixed wick 19 and again allowing the flow of the liquid to the vaporizing-plate.

We claim as our invention—

1. In an apparatus for vaporizing liquids, the combination of a flexible moisture-conducting body divided at a convenient point into two separate parts, one end of one of which parts is immersed in a suitable liquid, whereby, when contact is effected between the two parts at the point of division, the liquid is caused to flow from one part to the other, and means substantially as described, for effecting and breaking contact between the said two parts from time to time as may be necessary.

2. In an apparatus for vaporizing liquids the combination of a flexible moisture-conducting body, divided at a convenient point, one end of which is immersed in a suitable liquid, whereby, when contact is effected between the two parts at the point of division, the liquid is caused to flow therethrough, and means automatically actuated by a hygrometer for effecting and breaking contact between said two parts, substantially as described.

3. In an apparatus for vaporizing liquids, a flexible wick of suitable moisture-conducting material, divided at a convenient point into two separate parts, one end of one of which parts is immersed in a suitable liquid, and the opposite end of the other part is attached to an evaporating-plate, whereby, when contact is effected between the two parts of the wick at the point of division, the liquid is caused to flow therethrough, and means substantially as described for effecting and breaking contact between two said parts.

4. In an apparatus for vaporizing liquids, a flexible wick of suitable moisture-conducting material, one end of which is immersed in a suitable liquid and the opposite end of which is arranged to come into contact with a suitable moisture-conducting body attached to an evaporating-plate, whereby when contact is effected between the two, the liquid is caused to flow therethrough; and means for effecting and breaking contact between the said bodies, substantially as described.

5. In an apparatus for vaporizing liquids the combination of a flexible wick of suitable moisture-conducting material, divided at a convenient point, one end of which is immersed in a suitable liquid, and the other end of which is attached to an evaporating-plate, whereby, when contact is effected between the two parts of the wick at the point of division, the liquid is caused to flow therethrough, and devices actuated by an electromagnet substantially as described, for making and breaking contact between said two parts, through the making and breaking of the electric current.

6. In an apparatus for vaporizing liquids the combination of a flexible wick of suitable moisture-conducting material, divided at a convenient point, one end of which is immersed in a suitable liquid, and the other end of which is attached to an evaporation-plate, whereby, when contact is effected between the two parts of the wick at the point of division, the liquid is caused to flow therethrough; an electromagnet the core of which actuates devices for making and breaking contact between said two parts, by the making or breaking of its electric circuit, and a hygrometer for automatically making or breaking the electric circuit of the electromagnet substantially as described.

7. In an apparatus for vaporizing liquids, the combination of a tank containing a suitable liquid; a flexible wick of suitable moisture-conducting material divided at a convenient point into two parts one of which parts is attached at one end to a vaporizing-plate; a rocking shaft over the tank carrying arms to which the other part of the wick is so attached that one end is immersed in the liquid in the tank, by the rocking of which contact between the two ends of the two parts of the wick at the point of division is made and broken; an electromagnet, the coil of which is arranged to actuate the rocking shaft; counterweights attached to the shaft for restoring the same to its original position, and devices for maintaining the liquid in the tank at a constant level.

8. In an apparatus for vaporizing liquids, the combination of a tank containing a suitable liquid; a flexible wick of suitable moisture-conducting material divided at a convenient point into two parts one of which parts is attached at one end to a vaporizing-plate; a rocking shaft over the tank carrying arms to which the other part of the wick is so attached that one end is immersed in the liquid in the tank, by the rocking of which contact between the two ends of the two parts of the wick at the point of division is made and broken; an electromagnet, the coil of which is arranged to actuate the rocking shaft; counterweights attached to the shaft for restoring the same to its original position; devices for maintaining the liquid in the tank at a constant level, and an hygrometer for automatically making or breaking the electric circuit of the electromagnet and actuating the rocking shaft substantially as described.

9. In an apparatus for vaporizing liquids, the combination of a tank containing a suitable liquid; a flexible wick of suitable moisture-conducting material divided at a convenient point into two parts one of which parts is attached at one end to a vaporizing-plate and at the other to a sponge-like material; a rocking shaft over the tank carrying arms to which the other part of the wick is so attached that one end is immersed in the liquid in the tank, by the rocking of which contact between the free end of one part of the wick and the sponge is made and broken; an electromagnet, the coil of which is arranged to actuate the rocking shaft; counterweights attached to the shaft for restoring the same to its original position; devices for maintaining the liquid in the tank at a constant level, and an hygrometer for automatically making or breaking the electric circuit of the electromagnet and actuating the rocking shaft substantially as described.

In testimony that we claim the foregoing as our invention we have signed our names, in presence of two witnesses, this 13th day of February, 1901.

WILLIAM GORDON LYLE.
JOHN EDWIN STEWART.

Witnesses:
EDWIN T. RICE, Jr.,
WILLARD PARKER BUTLER.